United States Patent
Krimer et al.

(10) Patent No.: US 6,601,155 B2
(45) Date of Patent: Jul. 29, 2003

(54) HOT WAY CACHES: AN ENERGY SAVING TECHNIQUE FOR HIGH PERFORMANCE CACHES

(75) Inventors: Evgeni Krimer, Eilat (IL); Bishara Shomar, Nazareth (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 09/823,170

(22) Filed: Mar. 29, 2001

(65) Prior Publication Data

US 2003/0014594 A1 Jan. 16, 2003

(51) Int. Cl.$^7$ .............................................. G06F 12/08
(52) U.S. Cl. ...................... 711/205; 711/128; 711/137
(58) Field of Search ............................... 711/128, 129, 711/130, 137, 204, 205, 213

(56) References Cited

U.S. PATENT DOCUMENTS

| 5,913,223 A | * | 6/1999 | Sheppard et al. ........... 711/118 |
| 5,920,888 A | * | 7/1999 | Shirotori et al. ............ 711/128 |
| 6,115,792 A | * | 9/2000 | Tran .......................... 711/128 |
| 6,356,990 B1 | * | 3/2002 | Aoki et al. ................ 711/205 |
| 6,425,055 B1 | * | 7/2002 | Sager et al. ................ 711/118 |

* cited by examiner

Primary Examiner—Gary Portka
(74) Attorney, Agent, or Firm—Blakely, Sokoloff, Taylor & Zafman LLP

(57) ABSTRACT

A device is presented including a processor. A local memory is connected to the processor. The processor includes a hot way cache accessing process. A method is presented that includes accessing a memory. The method includes processing a first plurality of memory cells and a second plurality of memory cells in the memory. The method determines if a memory block is a last recently accessed memory block. The method determines whether a memory block accessed is a hit or a miss. The method accesses a lower memory level if the memory block accessed is a miss. Also, processing the second plurality of memory cells for an exact block if the block accessed is a hit but not the last recently accessed memory block. And, providing the memory block for additional access if the memory block accessed is a hit and is a last recently accessed memory block.

20 Claims, 5 Drawing Sheets

HOT WAY CACHES: AN ENERGY SAVING TECHNIQUE FOR HIGH PERFORMANCE CACHES

BACKGROUND OF THE INVENTION

1. Field of the Invention

This invention relates to reducing power consumption, and more particularly to a method and apparatus of reducing power consumption of caches without performance degradation.

2. Description of the Related Art

In many of today's processing systems, such as notebook computer systems, it is important to reduce the power consumption and energy use. In processing systems, cache memory schemes are used to optimize performance. High performance caches, however, tend to increase power consumption.

The benefits of a cache are maximized whenever the number of access requests to cached memory addresses, known as "cache hits," are maximized relative to the number of access requests to non-cached memory addresses, known as "cache misses." Despite the added overhead that typically occurs as a result of a cache miss, as long as the percentage of cache hits is high, the overall access rate for the system is increased.

In most computer memory systems, memory hierarchy plays a major role in determining the actual system performance. The high speed memory close to the processor is referred to as level one, or L1, cache, and a cheaper, denser, slower memory is referred to as level two, or L2, cache. This hierarchy may continue for numerous levels. The lowest level memory, level N or $L_N$, is typically main memory, such as random access memory (RAM) or dynamic RAM (DRAM). Distance from the processor refers to the number of processor cycles it takes to get data to the processor from that level of the memory hierarchy. Thus, in a memory hierarchy, the closer to the processor the data resides, the higher the performance.

When data is not found in the higher level of the memory hierarchy and a miss occurs, the data must be accessed from a lower level of memory hierarchy. Since each level of the memory hierarchy contains increased amounts of storage, the probability increases that the data will be found. But equally important for performance is the latency or number of cycles it takes to transfer the first byte of data to the processor plus the time to transfer the remaining bytes of the cache line.

A cache consists of S sets and W ways. Each set contains several cache lines, i.e. W is equal to one or more. Each cache line contains control information and data information. The control information consists of tags, which typically contain an address and coherency bits. The data information consists of a data array. Additionally, each set has control bits that may implement a replacement algorithm, such as least recently used (LRU) or pseudo LRU (PLRU).

A tag is a set of bits attached to a block (a block is the smallest unit that may be copied to or from memory) that define several characteristics, and in particular, the address it is currently mapped to. An example of a format for a data array is illustrated in FIG. 1. In the example of FIG. 1, data array 100 comprises 10 check bits and 128 data bits. An example of a format for a tag array is illustrated in FIG. 2. In the example of FIG. 2, tag array 200 comprises 7 check bits and 26 tag bits.

Caches may have different degrees of associativity, and are often referred to as being N-way set associative. In a one-way set associative cache, each memory address is mapped to one cache line. This type of cache, however, is typically prone to "hot" locations where multiple memory addresses from different cache pages that are accessed relatively frequently are mapped to the same entry in the cache, resulting in frequent cache misses and lower performance. Multi-way set associative caches, such as four-way set associative caches, provide multiple cache lines to which a particular memory address may be mapped.

There are existing cache schemes that sequentially (also known as serial schemes) or concurrently (also known as parallel schemes) compare the tag for a given memory address with the tag for each entry in the set. A serial cache scheme accesses the tag array, performs a tag match, then accesses the data array for the specified cache line only. Accessing the data array of only one cache way lowers the total power consumed by the data cache memory array, since not all data arrays in a set are activated for every cache memory access. Since this decision takes time to make, it impacts the access time requirements, therefore impacting the performance of the cache. A parallel cache accessing scheme is used to enhance performance of processors, but tends to increase power consumption by activating all data arrays in parallel speculatively.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to an apparatus and method to reduce the power consumption in caches with minimal performance degradation. Referring to the figures, exemplary embodiments of the invention will now be described. The exemplary embodiments are provided to illustrate the invention and should not be construed as limiting the scope of the invention.

A set associative cache of size B blocks is broken into N sets, with the same number blocks allocated to all sets. For example, an eight-way set associative cache with 32 blocks per set has a total of 256 blocks. In a set associative cache, the set into which a block at memory address M is stored is given by M mod N. The destination block in the set can be any block in the set.

When a set associative cache is accessed in parallel, all the data arrays in the appropriate set are accessed without any information about which line from the set will be used. Selecting the appropriate line from the set is done at the end of the "tag matching" process. This approach improves performance, but increases power consumption since too many unnecessary blocks are accessed in the data array.

Figure 3:
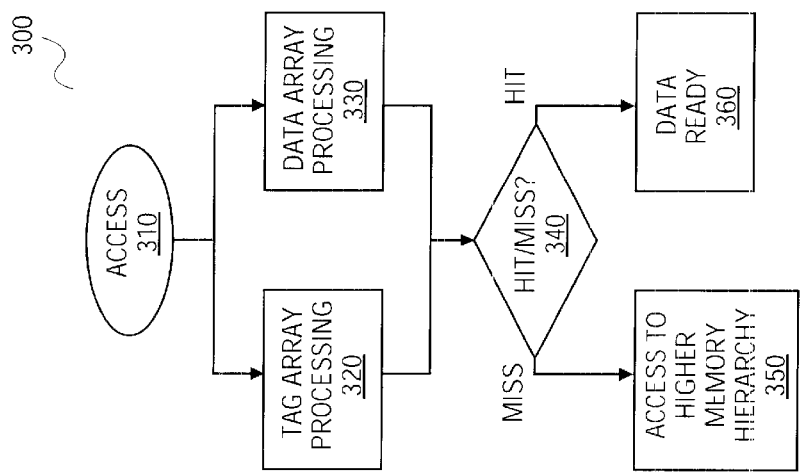
FIG. 3 illustrates a block diagram of a parallel cache accessing scheme.

FIG. 3 illustrates a flow diagram for a parallel cache accessing scheme. When process 300 performs an access process block 310, it is readily understood that tag array processing block 320 and data array processing block 330 are processed in parallel. After the parallel processing of block 320 and 330, block 340 determines whether or not a cache hit or cache miss occurs. A cache miss is a condition where a processor, such as a central processing unit (CPU), is attempting to access a block in memory that is not already stored in the cache memory. Therefore, the block must be loaded from a lower level, that is an external cache or main memory in the memory hierarchy. A cache hit occurs when the block is already in the cache and does not need to be loaded. In process 300, immediately after the tag match is completed, the corresponding cache line from the accessed set is used.

Figure 1:
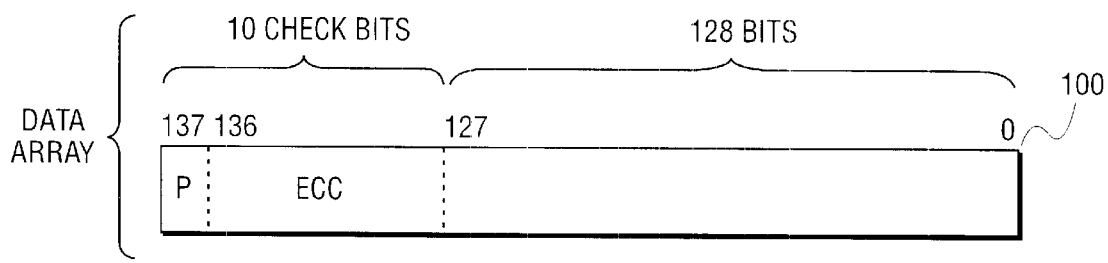
FIG. 1 illustrates an example of a data array format.
Figure 2:
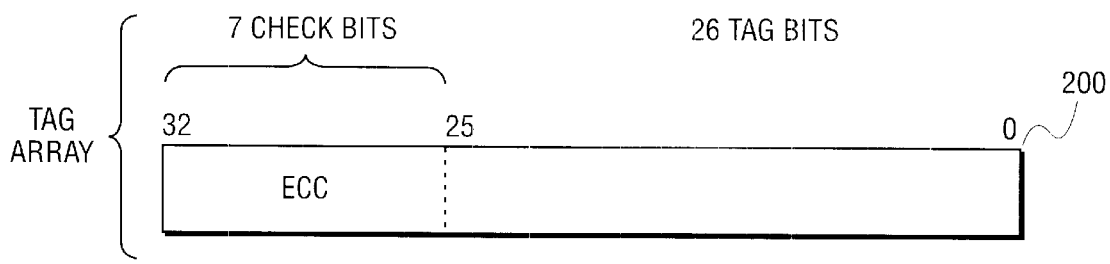
FIG. 2 illustrates an example of a tag array format.
Figure 4:
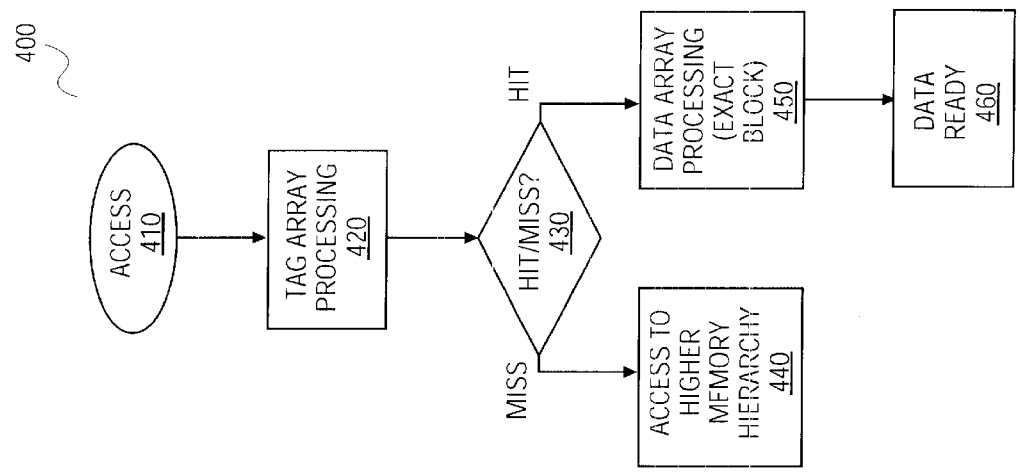
FIG. 4 illustrates a block diagram of a sequential cache accessing scheme.

FIG. 4 illustrates a flow diagram for a sequential or serial cache accessing scheme. In FIG. 4, upon accessing process block 410, tag processing block 420 commences. Block 430 of process 400 then determines whether a hit or miss occurred. If a miss occurred, block 440 processes to access lower level in the memory hierarchy. If block 430 determines that a hit occurred, block 450 processes the data array. Upon block 450 processing the data array, the data array is accessed only for the specified cache line. This differs from the parallel processing scheme in that the parallel processing scheme accesses the entire set of cache lines.

In one embodiment of the invention, the hot way cache accessing scheme accesses the tag and data array in parallel, but instead of accessing the data portions of all the cache lines in the set, only the last accessed line in the set (the "hot way") is accessed, i.e., a high probability prediction for a hit. One should note, however, that the line chosen may be any line that has a high probability for a hit other than the last recently accessed line. In one embodiment of the invention a subset of the lines that have been recently accessed may be chosen from the full set of lines. From the subset, a further prediction may be made to give a higher probability of which line will be the next correct line.

After tag matching, it is known whether the cache line that was fetched is the right or wrong cache line. In the case where the correct line is accessed, the access process is completed. In the case where there is a cache hit, but the cache line fetched is the wrong cache line, the data array is accessed again for the required cache line. That is, a penalty time is added for not accessing the right cache line. If the access results in a cache miss, the miss is recognized after tag matching, and power is saved since only one data block is accessed, instead of several data blocks.

Locating the hot way requires keeping track of the last accessed way in each set. If either least recently used (LRU) or pseudo LRU replacement policies are used, this information is already available. Thus, no extra memory storage is required. In one embodiment, predicting the correct cache line to access within the set is a factor that is important to the success of power savings and performance. In the instruction cache, the majority of the cache accesses typically access the same line in the set as was accessed during the previous access to the same set. A lesser amount of cache accesses in the data cache access the same line in the set as was accessed during the previous access to the same set. In a typical example, more than 97% of accesses in the instruction cache and 90% accesses in the data cache access the same line as the last line accessed in the set.

Figure 5:
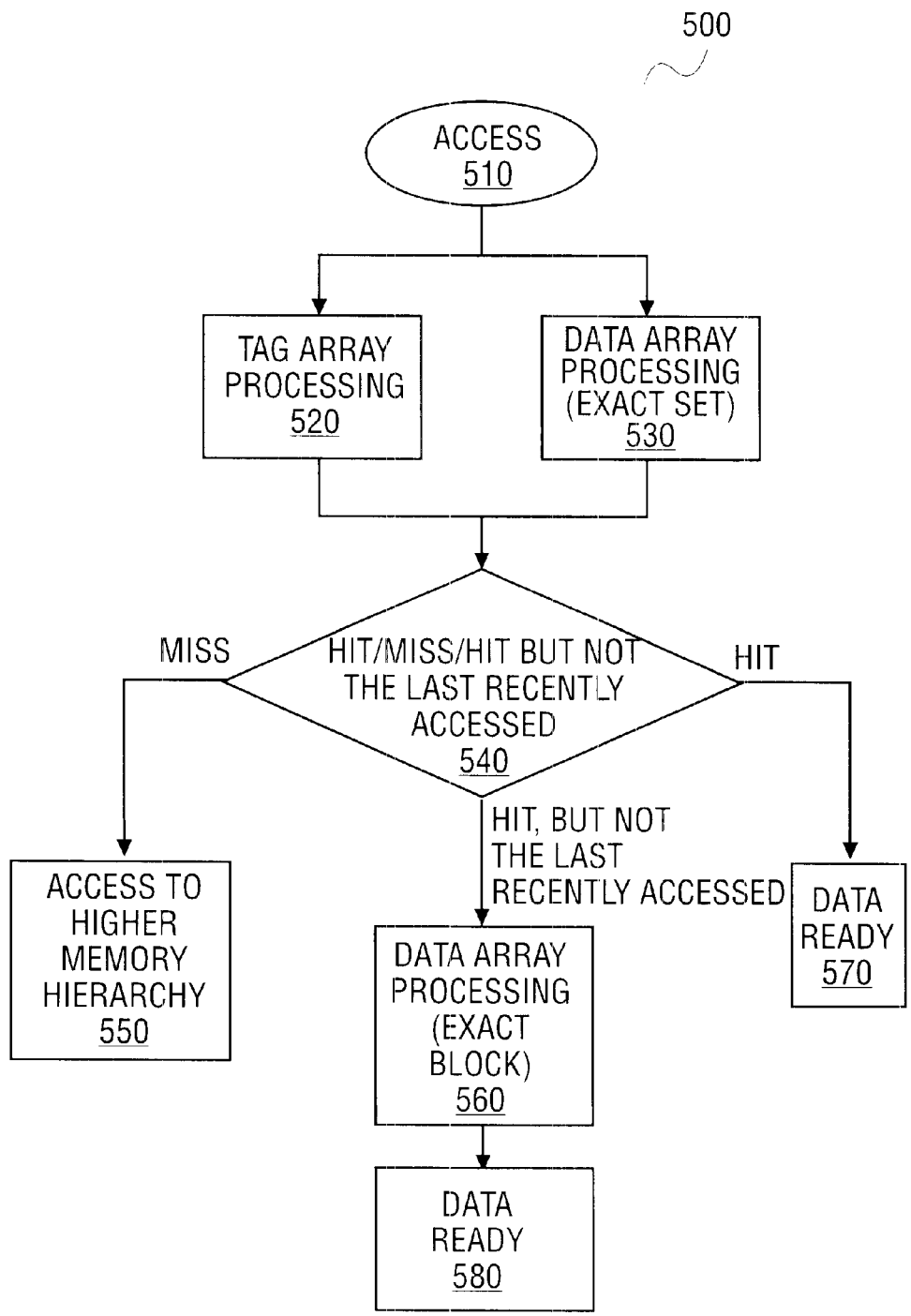
FIG. 5 illustrates a block diagram of an embodiment of the invention having a hot way cache accessing scheme.

FIG. 5 illustrates a flow diagram of an embodiment of the invention having "hot way" cache accessing. The hot way cache accessing approach commences with block 510. Upon an access of the cache, tag array processing in block 520 and data array processing in block 530 occur in parallel, which is similar to the parallel accessing scheme illustrated in FIG. 4, but is limited to one data array only. In one embodiment of the invention, block 540 determines if either a hit occurred, a miss occurred, or whether a hit occurred, but not the last accessed block (as determined by the LRU bits). If a miss occurs, process 500 continues with block 550 which accesses lower level in the memory hierarchy. If a hit occurs, process 500 continues with block 570, in which data is ready to be accessed. And, if a hit occurs, but the data is not the last accessed block, process 500 continues with block 560 where the data array is processed for the exact block, or cache line to be processed. In the case of block 560, after the data array is processed, process 500 continues with block 580, wherein the data is ready to be accessed from the cache.

Figure 6:
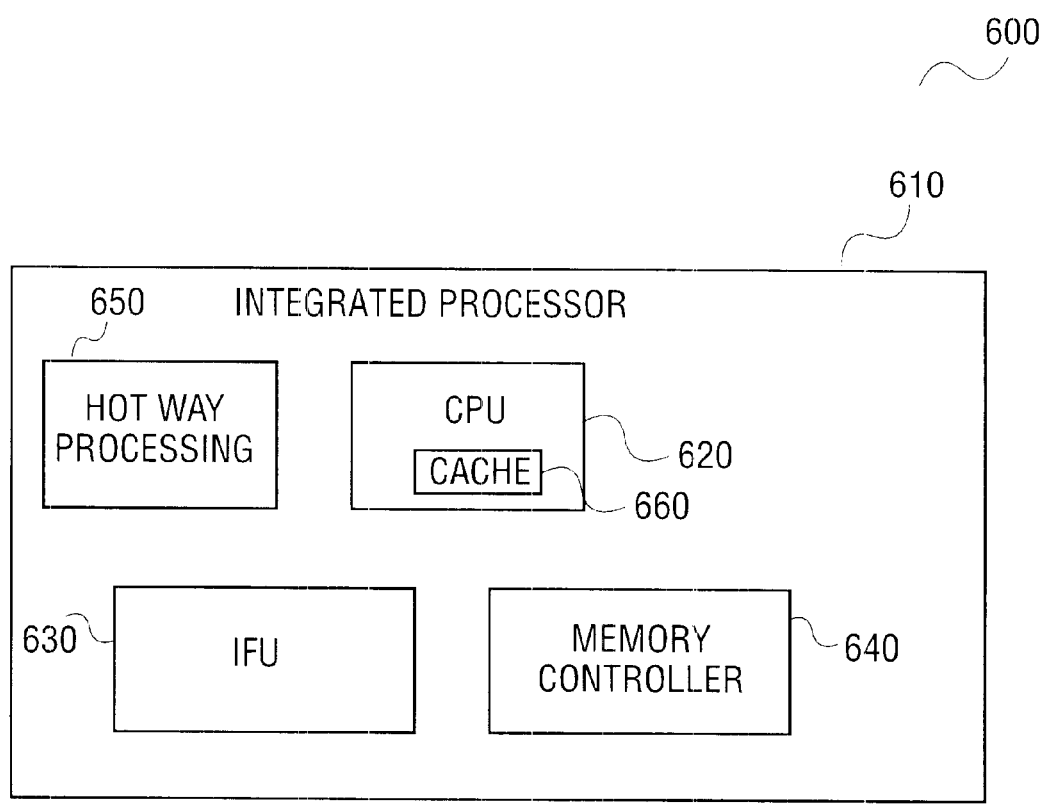
FIG. 6 illustrates an embodiment of the invention having a hot way cache processor.

FIG. 6 illustrates an embodiment of the invention having integrated processor 600. Integrated processor 600 also comprises a central processing unit 620 (CPU), cache 660, instruction fetch unit (IFU) 630, memory controller 640 and hot way processor 650. In one embodiment of the invention, hot way processor 650 includes the process illustrated in FIG. 5 (as described above). Cache 660 may be any high level cache in a memory hierarchy, such as L1, L2 or L3. Cache 660 may also be replaced by suitable future memory structures.

Figure 7:
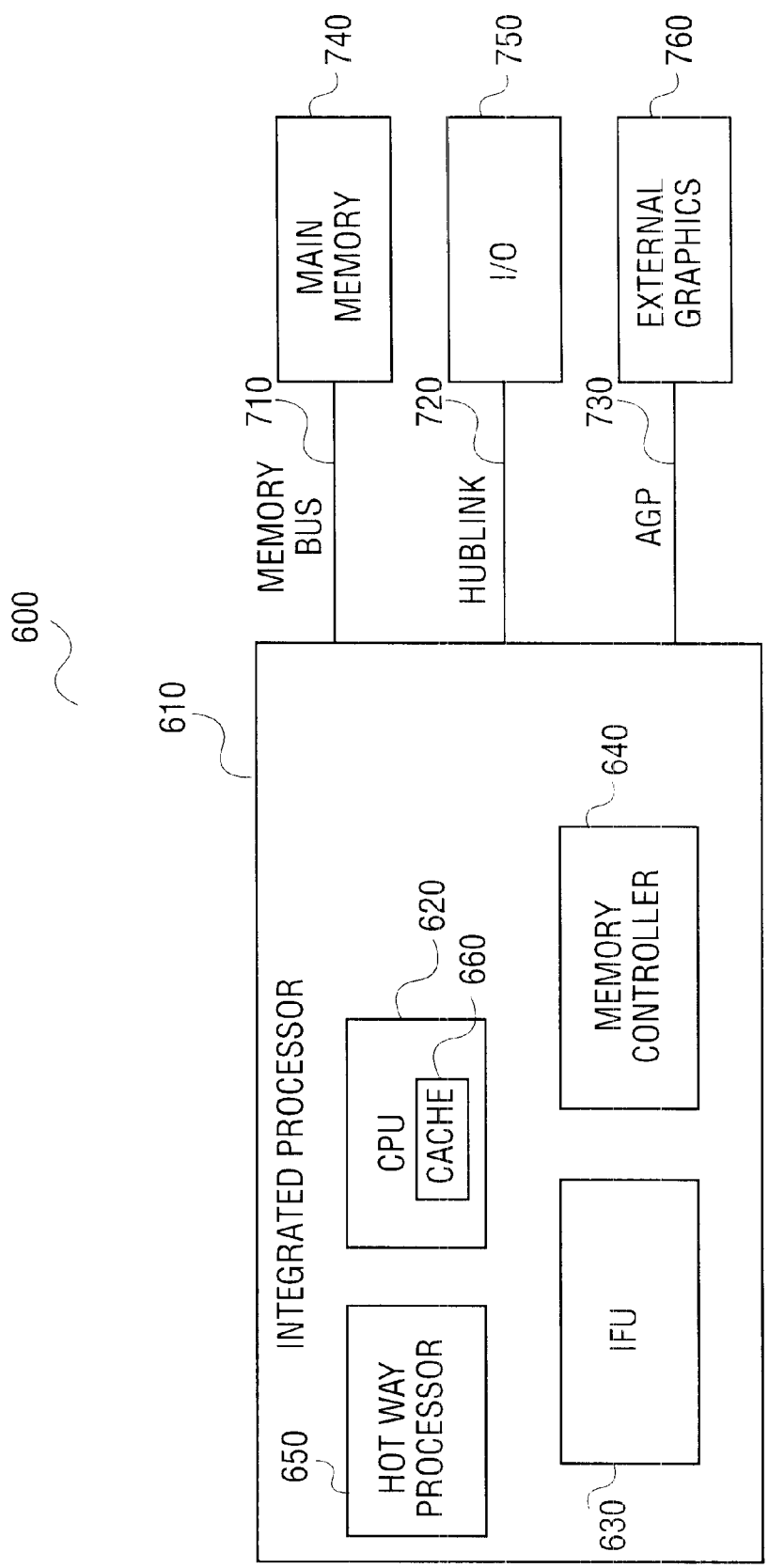
FIG. 7 illustrates an embodiment of the invention having a system with a processor having a hot way cache accessing scheme.

FIG. 7 illustrates an embodiment of the invention having system 700. System 700 comprises integrated processor 600 (as illustrated in FIG. 6), memory bus 710, main memory 740, hublink 720, input/output (I/O) processor 750, accelerated graphics port (AGP) 730, and external graphics 760. One should note that additional processors and/or elements may also be coupled with integrated processor 600. In one embodiment of the invention, system 700 includes hot way processor 650, which includes the process illustrated in FIG. 5 (as described above).

With the use of embodiments of the invention's hot way cache scheme, a reduction in energy is achieved without an increase in processing time that is typically seen in sequential cache accessing schemes. As a result, a large reduction of power in IFU 630 is seen, leading to an overall reduction in system power consumption. Thus, these reductions in power are achieved without a large tradeoff in performance. With the reduction of power consumption by using embodiments of the invention, data blocks may be enlarged, and/or additional information may be added to each data block. These improvements were typically very expensive in terms of power consumption previously.

The above embodiments can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:

a processor; and a local memory coupled to the processor, the processor includes a hot way cache accessing process, the hot wax each accessing process selects a specific subset of a plurality of cache lines with a high probability for a cache hit for data array processing and processes a tag array in parallel with data array processing of the specific subset of the plurality of cache lines.

wherein after data array processing of the subset of the plurality of cache lines and tag array processing if the processor determines that there is a cache hit, but the cache hit is not in the subset of the plurality of cache lines, the processor processes the data array for the exact cache line for the cache hit.

2. The apparatus of claim 1, wherein the local memory is a cache.

3. The apparatus of claim 2, the cache comprising a plurality of tag portions and a plurality of data portions.

4. The apparatus of claim 3, wherein the hot way cache accessing process accesses the plurality of tag portions and plurality of data pox lions of the subset of the plurality of cache lines in parallel, and only a last accessed cache line is accessed.

5. A system comprising:

a processor;

a local memory coupled to the processor, the processor including a hot way cache accessing process;

a main memory coupled to the processor; and a memory controller coupled to the processors, the hot way cache accessing process selects a specific subset of a plurality of cache lines with a high probability for a cache hit for data array processing and processes a tag array in parallel with data array processing of the specific subset of the plurality of cache lines, wherein after data array processing of the subject of the plurality of cache lines and tag array processing, if the processor determines that there is a cache hit, but the cache hit is not in the subset of the plurality of cache lines, the processor processes the data array for the exact cache line for the cache hit.

6. The system of claim 5, wherein the local memory is a cache.

7. The system of claim 5, the cache comprising a plurality of tag portions and a plurality of data portions.

8. The system of claim 5, wherein only a last accessed cache line is accessed.

9. A method comprising;

attempting to access a memory;

processing a first plurality of memory cells and a second plurality of memory cells in the memory in parallel;

determining if a memory block in the memory is a last recently accessed memory block;

determining whether the attempt to access the memory is one of a success (hit) and a failure (miss);

accessing a lower memory level if the attempt to access the memory is a miss;

processing the second plurality of memory cells for an exact block if the attempt to access the memory is a hit but the block accessed is not the last recently accessed memory block; and providing the memory block for additional access if the attempt to access the memory is a hit and the memory block accessed is a last recently accessed memory block.

10. The method of claim 9, wherein the memory is a local cache memory.

11. The method of claim 9, wherein the first plurality of memory cells is at least one tag array and the second plurally of memory cells is at least one data array.

12. The method of claim 11, further comprising:

selecting a subset of a plurality of cache lines with a high probability for a cache hit for the determining whether the attempt to access the memory is one of a success (hit) and a failure (miss).

13. The method of claim 9, wherein only a last accessed cache line is accessed.

14. The method of claim 11, wherein the method reduces power consumption by predicting a correct cache line to access; within a set, wherein data array processing is performed on only a specific subset of a plurality of cache lines with a high probability for a cache hit.

15. A program storage device readable by a machine comprising instructions that cause the machine to:

attempt to access a memory;

process a first plurality of memory cells and a second plurality of memory cells in the memory in parallel;

determine if a memory block in the memory is a last recently accessed memory block;

determine whether the attempt to access the memory one of a success (hit) and a failure (miss)

accessed a memory level if the attempt to access the memory is a miss;

process the second plurality of memory cells for an exact block if the attempt to access the memory is a hit but the block accessed is not a last recently accessed memory block; and provide the memory block for additional access if the attempt to access the memory is a hit and the memory block accessed is a last recently accessed memory block.

16. The program storage device of claim 15, wherein the memory is a local cache memory.

17. The program storage device of claim 16, wherein the first plurality of memory cells is at least one tag array and the second plurality of memory cells is at least one data array.

18. The program storage device of claim 17, farther comprising instructions that cause the machine to:

select a subset of a plurality of cache lines with a high probability for a cache hit.

19. The program storage device of claim 15, wherein only a last accessed cache line is accessed.

20. The program storage device of claim 15, wherein the instructions reduce power consumption by predicting a correct cache line to access within a set, wherein data array processing is performed on a only a specific subset of a plurality of cache lines wit a high probability for a cache hit.

* * * * *

UNITED STATES PATENT AND TRADEMARK OFFICE
CERTIFICATE OF CORRECTION

PATENT NO.   : 6,601,155 B2
DATED        : July 29, 2003
INVENTOR(S)  : Krimer et al.

It is certified that error appears in the above-identified patent and that said Letters Patent is hereby corrected as shown below:

Column 5,
Line 8, delete "wax each" and insert -- way cache --.
Line 27, delete "pox lions" and insert -- portions --.
Line 36, delete "processors" and insert -- processor --.
Line 43, delete "subject" and insert -- subset --.

Column 6,
Line 25, after the word "access", delete ";".
Line 35, after the word "memory", insert -- block accessed is --.
Line 37, before the word "memory", insert -- lower --.
Line 53, delete "farther", and insert -- further --.
Line 62, delete the first occurrence of "a".
Line 63, delete "wit" and insert -- with --.

Signed and Sealed this

Thirteenth Day of January, 2004

JON W. DUDAS
*Acting Director of the United States Patent and Trademark Office*